United States Patent
Kumamoto

(10) Patent No.: US 7,256,151 B2
(45) Date of Patent: Aug. 14, 2007

(54) SOLID CATALYST COMPONENT FOR α-OLEFIN POLYMERIZATION, PROCESS FOR PRODUCING CATALYST THEREFOR, AND PROCESS FOR PRODUCING α-OLEFIN POLYMER

(75) Inventor: Shin-ichi Kumamoto, Ichihara (JP)

(73) Assignee: Sumitomo Chemical Company Limited, Tokyo (JP)

( * ) Notice: Subject to any disclaimer, the term of this patent is extended or adjusted under 35 U.S.C. 154(b) by 0 days.

(21) Appl. No.: 11/110,058

(22) Filed: Apr. 20, 2005

(65) Prior Publication Data

US 2005/0267272 A1   Dec. 1, 2005

(30) Foreign Application Priority Data

May 31, 2004   (JP)   ............................. 2004-160848

(51) Int. Cl.
*C08F 4/64* (2006.01)
*C08F 10/04* (2006.01)

(52) U.S. Cl. ...................... 502/127; 502/126; 502/134; 502/132; 502/133

(58) Field of Classification Search ................ 502/103, 502/127, 126, 134, 132, 133; 526/129
See application file for complete search history.

(56) References Cited

U.S. PATENT DOCUMENTS

| | | | |
|---|---|---|---|
| 4,952,649 A | 8/1990 | Kioka et al. | |
| 4,971,937 A | 11/1990 | Albizzati et al. | |
| 5,095,153 A | 3/1992 | Agnes et al. | |
| 5,539,067 A | 7/1996 | Parodi et al. | |
| 5,608,018 A | 3/1997 | Ebara et al. | |
| 5,902,765 A * | 5/1999 | Takahashi et al. | 502/127 |
| 5,936,049 A * | 8/1999 | Kojoh et al. | 526/114 |
| 6,187,883 B1 | 2/2001 | Satoh et al. | |
| 6,194,342 B1 | 2/2001 | Parodi et al. | |
| 6,331,501 B1 * | 12/2001 | Satoh et al. | 502/128 |
| 6,362,124 B1 * | 3/2002 | Kuribayashi et al. | 502/116 |
| 6,395,670 B1 * | 5/2002 | Morini et al. | 502/104 |
| 6,515,085 B1 | 2/2003 | Parodi et al. | |
| 6,566,464 B2 * | 5/2003 | Fujiwara et al. | 526/125.3 |
| 6,680,360 B2 * | 1/2004 | Kumamoto | 526/124.3 |
| 6,683,139 B2 * | 1/2004 | Fujita et al. | 526/129 |
| 6,703,456 B2 * | 3/2004 | Mori et al. | 526/124.3 |
| 6,841,503 B2 * | 1/2005 | Fujiwara et al. | 502/128 |
| 6,858,685 B2 * | 2/2005 | Yoshimura et al. | 526/129 |

FOREIGN PATENT DOCUMENTS

JP            61078803 A           4/1986

* cited by examiner

*Primary Examiner*—C. Melissa Koslow
(74) *Attorney, Agent, or Firm*—Akin Gump Strauss Hauer & Feld LLP

(57) ABSTRACT

A solid catalyst component for α-olefin polymerization, which comprises a titanium atom, a magnesium atom, a halogen atom, a phthalic acid ester compound, and a 1,3-diether compound, wherein an amount of the 1,3-diether compound contained in the solid catalyst component is 0.1 to 3 mol per one mol of the phthalic acid ester compound contained therein; a process for producing a catalyst for α-olefin polymerization, which comprises the step of contacting at least the above solid catalyst component, an organoaluminum compound, and an external electron donor compound with one another; and a process for producing an α-olefin polymer, which comprises the step of homopolymerizing or copolymerizing an α-olefin in the presence of a catalyst produced by the above process.

5 Claims, No Drawings

SOLID CATALYST COMPONENT FOR α-OLEFIN POLYMERIZATION, PROCESS FOR PRODUCING CATALYST THEREFOR, AND PROCESS FOR PRODUCING α-OLEFIN POLYMER

FIELD OF THE INVENTION

The present invention relates to a solid catalyst component for α-olefin polymerization; a process for producing a catalyst for α-olefin polymerization; and a process for producing an α-olefin polymer.

BACKGROUND OF THE INVENTION

Examples of a combination known in the art of catalyst components for a highly stereoregular polymerization of an α-olefin are as follows:

(1) a combination of (i) a catalyst component produced by supporting a tetravalent titanium halide on a magnesium halide, (ii) an organoaluminum compound (promoter), and (iii) an organosilicon compound (third component) (JP 57-63310A, JP 58-83006A and JP 61-78803A);

(2) a combination of (i) a trivalent titanium compound-containing solid catalyst component produced by a process comprising the steps of (i-1) reducing a titanium compound with an organomagnesium compound in the presence of an organosilicon compound and an ester compound to produce a first solid product, (i-2) contacting the first solid product with an ester compound to produce a second solid produce, and (i-3) contacting the second solid product with a halogenation compound (for example, titanium tetrachloride) and an internal electron donor (for example, an ether compound, and a mixture thereof with an ester compound), (ii) an organoaluminum compound (promoter), and (iii) an external electron donor (third component) (JP 7-216017A); and (3) a combination of (i) a trivalent titanium compound-containing solid catalyst component produced by a process comprising the steps of (i-1) reducing a titanium compound with an organomagnesium compound in the presence of an organosilicon compound and an ester compound to produce a first solid product, and (i-2) contacting the first solid product with a halogenation compound (for example, titanium tetrachloride), an internal electron donor (for example, an ether compound, and a mixture thereof with an ester compound), and an organic acid halide compound, (ii) an organoaluminum compound (promoter), and (iii) an external electron donor (third component) (JP 10-212319A).

SUMMARY OF THE INVENTION

However, each of the above-mentioned combinations has a problem in that a great amount of hydrogen as a molecular weight regulator is necessary in order to produce a low molecular weight polypropylene having high stiffness and excellent melt flowability; namely, each of the above-mentioned combinations is inferior in its ability to control a molecular weight with hydrogen.

In view of said problem, an object of the present invention is to provide (1) a process for producing a catalyst for α-olefin polymerization, which has an excellent ability to control a molecular weight with hydrogen, and which can produce an α-olefin polymer with a high stereoregularity, (2) a solid catalyst component used for said process, and (3) a process for producing an α-olefin polymer, which uses a catalyst produced by said process.

The present invention is a solid catalyst component for α-olefin polymerization, which comprises a titanium atom, a magnesium atom, a halogen atom, a phthalic acid ester compound, and a 1,3-diether compound, wherein an amount of the 1,3-diether compound contained in the solid catalyst component is 0.1 to 3 mol per one mol of the phthalic acid ester compound contained therein.

Also, the present invention is a process for producing a catalyst for α-olefin polymerization, which comprises the step of contacting at least the above-mentioned solid catalyst component for α-olefin polymerization, an organoaluminum compound, and an external electron donor compound with one another.

Further, the present invention is a process for producing an α-olefin polymer, which comprises the step of homopolymerizing or copolymerizing an α-olefin in the presence of a catalyst produced by the above-mentioned process for producing a catalyst for α-olefin polymerization.

The above-mentioned "solid catalyst component for α-olefin polymerization", "organoaluminum compound" and "external electron donor compound" are hereinafter referred to as the "component (A)", "component (B)" and "component C)", respectively.

DETAILED DESCRIPTION OF THE INVENTION

The component (A) of the present invention can be produced using a phthalic acid ester compound and a 1,3-diether compound in a process for producing a solid catalyst component disclosed in JP 46-34092B, JP 47-41676B, JP 55-23561B, JP 57-24361B, JP 52-39431B, JP 52-36786B, JP 1-28049B, JP 3-43283B, JP 4-80044A, JP 55-52309A, JP 58-21405A, JP 61-181807A, JP 63-142008A, JP 5-339319A, JP 54-148093A, JP 4-227604A, JP 6-2933A, JP 64-6006A, JP 6-179720A, JP 7-116252B, JP 8-134124A, JP 9-31119A, JP 11-228628A, JP 11-80234A or JP 11-322833A. As mentioned below, even when phthalic acid or other derivative thereof (for example, phthaloyl dichloride) than the above-mentioned phthalic acid ester compound is used in a process for producing a solid catalyst component for α-olefin polymerization of the present invention, both phthalic acid and other derivative thereof are converted into a phthalic acid ester compound in said process, respectively.

As a process for producing the component (A), there can be exemplified various processes comprising the step of contacting at least a magnesium compound, a titanium compound, a derivative of phthalic acid and 1,3-diether compound with one another, and specific examples thereof are the following processes (1) to (5):

(1) a process comprising the step of contacting a magnesium halide compound, a titanium compound, a derivative of phthalic acid and a 1,3-diether compound with one another;

(2) a process comprising the steps of (i) contacting an alcohol solution of a magnesium halide compound with a titanium compound to form a solid component, and (ii) contacting said solid component, a derivative of phthalic acid and a 1,3-diether compound with one another;

(3) a process comprising the steps of (i) contacting a solution containing a magnesium halide compound and a titanium compound with a precipitation agent to form a solid component precipitated, and (ii) contacting said solid component, a halogenation compound, a derivative of phthalic acid and a 1,3-diether compound with one another;

(4) a process comprising the step of contacting a dialkoxymagnesium compound, a titanium halide compound, a derivative of phthalic acid and a 1,3-diether compound with one another; and (5) a process comprising the step of contacting a solid component containing a magnesium atom, a titanium atom and a hydrocarbyloxy group, a halogenation compound, a derivative of phthalic acid, a 1,3-diether compound and an internal electron donor compound as an optional component with one another.

The above-mentioned "halogenation compound" means a compound capable of introducing one or more halogen atoms into a compound contacted therewith.

Among the above-mentioned processes (1) to (5), preferred is the process (5). The process (5) is hereinafter explained in more detail, wherein the "solid component containing a magnesium atom, a titanium atom and a hydrocarbyloxy group", "halogenation compound", "derivative of phthalic acid", "1,3-diether compound" and "internal electron donor compound as an optional component" are referred to as "component (a)", "component (b)", "component (c)", "component (d)" and "component (e)", respectively. The component (e) is used in any step of a process for producing the component (A) in order to improve a property such as a polymerization activity and a stereoregularity of a catalyst produced.

The component (a) contains preferably 50% or more of a three-valent titanium atom, wherein a total amount of a titanium atom contained therein is 100%, and contains a hydrocarbyloxy group in an amount of preferably 20% by weight or more, and more preferably 25% by weight or more, wherein a total amount of the component (a) is 100% by weight.

The component (a) is preferably a solid component produced by reducing a titanium compound represented by the following formula [1] with an organomagnesium compound in the presence of an organosilicon compound containing a Si—O bond, wherein the organosilicon compound containing a Si—O bond is preferably used in combination with an ester compound:

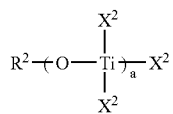

[I]

wherein a is a number of 1 to 20, preferably a number satisfying $1 \leq a \leq 5$, and more preferably 1, 2 or 4; $R^2$ is a hydrocarbon group having 1 to 20 carbon atoms; and $X^2$ is a halogen atom, or a hydrocarbyloxy group having 1 to 20 carbon atoms, and preferably a straight-chain alkoxy group having 2 to 18 carbon atoms, and all $X^2$s are the same as, or different from one another. The above-mentioned "organosilicon compound containing a Si—O bond", "titanium compound represented by the above formula [I]", "organomagnesium compound" and "ester compound" are hereinafter referred to as the "compound (i)", "compound (ii)", "compound (iii)" and "compound (iv)", respectively.

Examples of the above-mentioned compound (i) are those represented by the following formulas:

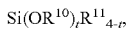

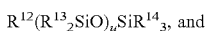

wherein $R^{10}$ is a hydrocarbon group having 1 to 20 carbon atoms; each of $R^{11}$, $R^{12}$, $R^{13}$, $R^{14}$ and $R^{15}$ is independently of one another a hydrocarbon group having 1 to 20 carbon atoms, or a hydrogen atom; t is an integer satisfying $0 < t \leq 4$; u is an integer of 1 to 1,000; and v is an integer of 2 to 1,000.

Specific examples of the above-mentioned compound (i) are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Among them, preferred is an alkoxysilane compound represented by the above formula, $Si(OR^{10})_tR^{11}_{4-t}$, and in that case, t is preferably an integer satisfying $1 \leq b \leq 4$, and particularly preferably 4 (namely, tetraalkoxysilane compound), and most preferable compound is tetraethoxysilane.

Examples of $R^2$ in the above formula [I] are an alkyl group such as a methyl group, an ethyl group, a propyl group, an isopropyl group, a butyl group, an isobutyl group, an amyl group, an isoamyl group, a hexyl group, a heptyl group, an octyl group, a decyl group and a dodecyl group; an aryl group such as a phenyl group, a cresyl group, a xylyl group and a naphthyl group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a straight-chain alkyl group having 2 to 18 carbon atoms.

Examples of the halogen atom of $X^2$ in the above formula [I] are a chlorine atom, a bromine atom and an iodine atom. Among them, particularly preferred is a chlorine atom.

Examples of the hydrocarbyloxy group having 1 to 20 carbon atoms of $X^2$ in the above formula [I] are those corresponding to the above-exemplified hydrocarbon groups of $R^2$.

Examples of the above-mentioned compound (ii) are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, di-n-tetraisopropylpolytitanate (mixture of compounds having a of 2 to 10 in the above formula [II]), tetra-n-butylpolytitanate (mixture of compounds having a of 2 to 10 in the above formula [II]), tetra-n-hexylpolytitanate (mixture of compounds having a of 2 to 10 in the above formula [II]), and tetra-n-octylpolytitanate (mixture of compounds having a of 2 to 10 in the above formula [II]), and a condensate of a tetraalkoxytitanium produced by a reaction between a tetralkoxytitanium and a small amount of water. Among them, particularly preferred is tetra-n-butoxytitanium, tetran-butyltitanium dimer, or tetra-n-butyltitanium tetramer. Those compounds are used singly, or in combination of two or more thereof.

The above-mentioned compound (iii) may be any organomagnesium compound containing a magnesium-carbon bond therein. The compound (iii) is particularly preferably a Grignard compound represented by the following first formula, or a dihydrocarbylmagnesium represented by the following second formula:

$$R^{16}MgX^5, \text{ and}$$

$$R^{17}R^{18}Mg$$

wherein $R^{16}$ is a hydrocarbon group having 1 to 20 carbon atoms; $X^5$ is a halogen atom; and each of $R^{17}$ and $R^{18}$ is independently of each other a hydrocarbon group having 1 to 20 carbon atoms, and $R^{17}$ and $R^{18}$ are the same as, or different from each other. Among them, preferred is an ether solution of a Grignard compound from a viewpoint of a performance of a catalyst produced.

Examples of $R^{16}$, $R^{17}$ and $R^{18}$ are an alkyl group, an aryl group, an aralkyl group and an alkenyl group such as a methyl group, an ethyl group, a propyl group, an isopropyl group, a butyl group, a sec-butyl group, a tert-butyl group an isoamyl group a hexyl group, an octyl group, a 2-ethylhexyl group, a phenyl group and a benzyl group.

The compound (iii) may be used as a complex thereof soluble in a hydrocarbon solvent, which is formed by a combination thereof with an organometal compound. Examples of the organometal compound are those of Li, Be, B, Al or Zn.

Examples of the compound (iv) are an ester of a monocarboxylic acid, and that of a poly-carboxylic acid. Specific examples thereof are an ester of a saturated aliphatic carboxylic acid, that of an unsaturated aliphatic carboxylic acid, that of an alicyclic carboxylic acid, and that of an aromatic carboxylic acid. More specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl) phthalate, diisodecyl phthalate, dicyclohexyl phthalate and diphenyl phthalate. Among them, preferred is an ester of an unsaturated aliphatic carboxylic acid such as an ester of methacrylic acid and that of maleic acid, or an ester of an aromatic carboxylic acid such as an ester of phthalic acid; and psrticularly preferred is a dialkyl ester of phthalic acid.

Each of the above-mentioned compounds (i), (ii) and (iv) is preferably used in combination with an aliphatic hydrocarbon such as hexane, heptane, octane and decane; an aromatic hydrocarbon such as toluene and xylene; an alicyclic hydrocarbon such as cyclohexane, methylcyclohexane and decalin; or an ether compound such as diethyl ether, di-n-butyl ether, diisoamyl ether and tetrahydrofuran.

A reaction temperature of the above-mentioned reduction is usually −50 to 70° C., preferably −30 to 50° C., and particularly preferably −25 to 35° C. A reaction time thereof is not particularly limited, and it is usually about 30 minutes to about 6 hours. A reaction mixture obtained by said reduction reaction may further be heated at 20 to 120° C.

In the above-mentioned reduction reaction, a carrier such as a porous inorganic oxide and a porous organic polymer may be used in order to support the component (a) produced on the carrier. Said carrier may be that known in the art. Examples of the carrier are an inorganic oxide such as $SiO_2$, $Al_2O_3$, $MgO$, $TiO_2$ and $ZrO_2$; and a polymer such as polystyrene, a styrene-divinylbenzene copolymer, a styrene-ethylene glycol dimethacrylate copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene and polypropylene. Among them, preferred is an organic polymer, and particularly preferred is a styrene-divinylbenzene copolymer or an acrylonitrile-divinylbenzene copolymer.

A pore volume of the carrier in a pore radius of 20 to 200 nm is preferably 0.3 cm$^3$/g or more, and more preferably 0.4 cm$^3$/g or more; and a ratio of said pore volume is preferably 35% or more, and more preferably 40% or more, wherein a pore volume in a pore radius of 3.5 to 7,500 nm is 100%. When said pore volume is less than 0.3 cm$^3$/g, or said ratio is less than 35%, the component (a) may not be supported effectively on the carrier.

The compound (i) is used in an amount of usually 1 to 500 gram atom, preferably 1 to 300 gram atom, and particularly preferably 3 to 100 gram atom, in terms of an amount of a silicon atom contained in the compound (i), per 1 gram atom of a titanium atom contained in the compound (ii) used.

The compound (iii) is used in an amount of usually 0.1 to 10, preferably 0.2 to 5.0, and particularly preferably 0.5 to 2.0, in terms of a ratio of (1) a total of (1-1) an amount (gram atom) of a silicon atom contained in the compound (i) used, and (1-2) an amount (gram atom) of a titanium atom contained in the compound (ii) used to (2) an amount (gram atom) of a magnesium atom contained in the compound (iii) used.

Also, each of the compounds (i), (ii) and (iii) is used in an amount of 1 to 51, preferably 2 to 31, and particularly preferably 4 to 26, in terms of a ratio of (1) an amount (gram atom) of a magnesium atom contained in the component (A) produced to (2) an amount (gram atom) of a titanium atom contained therein.

The compound (iv) is used in an amount of usually 0.05 to 100 mol, preferably 0.1 to 60 mol, and particularly preferably 0.2 to 30 mol, per 1 gram atom of a titanium atom contained in the compound (ii) used.

The component (a) produced by the reduction reaction is usually separated from its reaction mixture, and then, washed several times with an inert hydrocarbon solvent such as hexane, heptane and toluene. The obtained component (a) contains a tri-valent titanium atom, a magnesium atom and a hydrocarbyloxy group, and generally has an amorphous structure, or a very weak crystalline structure. From a viewpoint of a catalyst performance, particularly preferred is an amorphous structure.

The component (d) is a compound containing a 1,3-dialkoxypropane structure, and an example thereof is that represented by the following formula:

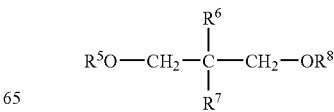

wherein each of $R^5$ to $R^8$ is independently of one another an alkyl group having 1 to 20 carbon atoms, an aryl group or an aralkyl group, and each of $R^6$ and $R^7$ may be a hydrogen atom.

Examples of the component (d) are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2-isopropyl-2-isopentyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane and 2-n-heptyl-2-isopentyl-1,3-dimethoxypropane. Among them, preferred is 2,2-diisobutyl-1,3-dimethoxypropane, 2,2-diisopropyl-1,3-dimethoxypropane, 2-isopropyl-2-isobutyl-1,3-dimethoxypropane, 2-isopropyl-2-isopentyl-1,3-dimethoxypropane, or 2,2-dicyclopentyl-1,3-dimethoxypropane. Those compounds are used singly, or in combination of two or more thereof.

An example of the above-mentioned component (c) is a compound represented by the following formula:

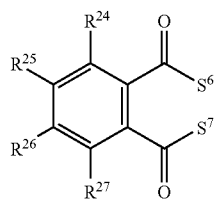

wherein each of $R^{24}$ to $R^{27}$ is independently of one another a hydrogen atom or a hydrocarbon group, and preferably a hydrogen atom or a hydrocarbon group having 1 to 10 carbon atoms, and they may be linked to one another to form a ring; and each of $S^6$ and $S^7$ is independently of each other a halogen atom, or a substituent formed by combining two or more selected from the group consisting of a hydrogen atom, a carbon atom, an oxygen atom and a halogen atom, and preferably a chlorine atom, a hydroxyl group or an alkoxy group having 1 to 20 carbon atoms.

Examples of the component (c) are phthalic acid, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, diisoheptyl phthalate, di-n-octyl phthalate, di(2-ethylhexyl) phthalate, di-n-decyl phthalate, diisodecyl phthalate, dicyclohexyl phthalate, diphenyl phthalate and phthalyl chloride. Among them, preferred is diethyl phthalate, di-n-propyl phthalate, diisopropyl phthalate, di-n-butyl phthalate, diisobutyl phthalate or phthalyl chloride, and more preferred is phthalyl chloride.

In the present invention, even when phthalic acid or other derivative thereof (for example, phthaloyl chloride mentioned above) than a phthalic acid ester compound is used as the component (c), both phthalic acid and other derivative thereof are converted into a phthalic acid ester compound in a process for producing the component (A). The component (A) contains preferably at least diethyl phthalate, di-n-propyl phthalate, diisopropyl phthalate, di-n-butyl phthalate or diisobutyl phthalate, and more preferably at least diethyl phthalate.

The above-mentioned component (b) is preferably a compound capable of replacing a hydrocarbyloxy group contained in the component (a) by a halogen atom. Among said compound, preferred is a halogen-containing compound of Group 4, 13 or 14 element in the periodic table, and particularly preferred is a halogen-containing compound of Group 4 or 14 element therein.

The halogen-containing compound of Group 4 element is preferably a compound represented by the following formula:

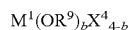

$$M^1(OR^9)_b X^4_{4-b}$$

wherein $M^1$ is an atom of Group 4; $R^9$ is a hydrocarbon group having 1 to 20 carbon atoms; $X^4$ is a halogen atom such as a chlorine atom, a bromine atom and an iodine atom, and particularly preferably a chlorine atom; b is an integer satisfying $0 \leq b < 4$, and preferably $0 \leq b \leq 2$, and is particularly preferably 0; and two or more $OR^9$s exist, they are the same as, or different from one another.

Examples of the above-mentioned $M^1$ are a titanium atom, a zirconium atom and a hafnium atom. Among them, preferred is a titanium atom.

Examples of the above-mentioned $R^9$ are an alkyl group such as a methyl group, an ethyl group, a propyl group, an isopropyl group, a butyl group, an isobutyl group, a tert-butyl group, an amyl group, an isoamyl group, a tert-amyl group, a hexyl group, a heptyl group, an octyl group, a decyl group and a dodecyl group; an aryl group such as a phenyl group, a cresyl group, a xylyl group and a naphthyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a straight-chain alkyl group having 2 to 18 carbon atoms.

Examples of the halogen-containing compound represented by the above formula are a titanium tetrahalide such as titanium tetrachloride, titanium tetrabromide and titanium tetraiodide; an alkoxytitanium trihalide such as methoxytitanium trichloride, ethoxytitanium trichloride, butoxytitanium trichloride, phenoxytitanium trichloride and ethoxytitanium tribromide; and a dialkoxytitanium dihalide such as dimethoxytitanium dichloride, diethoxytitanium dichloride, dibutoxytitanium dichloride; diphenoxytitanium dichloride and diethoxytitanium dibromide; and compounds formed by changing "titanium" contained in the above-mentioned compounds to "zirconium" or "hafnium". Among them, most preferred is titanium tetrachloride.

The above-mentioned halogen-containing compound of Group 13 or 14 element is preferably a compound represented by the following formula:

$$M^2 R^1_{m-c} X^8_c$$

wherein $M^2$ is an atom of Group 13 or 14; $R^1$ is a hydrocarbon group having 1 to 20 carbon atoms; $X^8$ is a halogen atom such as a fluorine atom, a chlorine atom, a bromine atom and an iodine atom, and preferably a chlorine atom; m is the valence of $M^2$, and when $M^2$ is, for example, a silicon atom, m is 4; and c is a number satisfying $0 < c \leq m$, and when $M^2$ is a silicon atom, c is preferably 3 or 4.

Examples of the atom of Group 13 are a boron atom, an aluminum atom, a gallium atom, an indium atom and a thallium atom. Among them, preferred is a boron atom or an aluminum atom, and more preferred is an aluminum atom.

Examples of the atom of Group 14 are a carbon atom, a silicon atom, a germanium atom, a tin atom and a lead atom. Among them, preferred is a silicon atom, a germanium atom or a tin atom, and more preferred is a silicon atom or a tin atom.

Examples of the above-mentioned $R^1$ are an alkyl group such as a methyl group, an ethyl group, a n-propyl group, an isopropyl group, a n-butyl group, an isobutyl group, an amyl group, an isoamyl group, a hexyl group, a heptyl group, an octyl group, a decyl group and a dodecyl group; an aryl group such as a phenyl group, a tolyl group, a cresyl group, a xylyl group and a naphthyl group; a cycloalkyl group such as a cyclohexyl group and a cyclopentyl group; an alkenyl group such as an allyl group; and an aralkyl group such as a benzyl group. Among them, preferred is an alkyl group or an aryl group; and particularly preferred is a methyl group, an ethyl group, a n-propyl group, a phenyl group or a p-tolyl group.

Examples of the above-mentioned halogen-containing compound of Group 13 element are trichloroborane, methyldichloroborane, ethyldichloroborane, phenyldichloroborane, cyclohexyldichloroborane, dimethylchloroborane, methylethylborane, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride and dimethylthallium chloride; and compounds formed by changing "chloro" contained in the above-mentioned compounds to "fluoro", "bromo" or "iodo".

Examples of the above-mentioned halogen-containing compound of Group 14 element are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-isobutyldichlorotin, diphenyldichlorotin, divinyldichlorotin, methyltrichlorotin, phenyltrichlorotin, dichlorolead, methylchlorolead and phenylchlorolead; and compounds formed by changing "chloro" contained in the above-mentioned compounds to "fluoro", "bromo" or "iodo". Among them, preferred is tetrachlorosilane, methyltrichlorosilane, ethyltrichlorosilane, n-propyltrichlorosilane, n-butyltrichlorosilane, phenyltrichlorosilane, tetrachlorotin, methyltrichlorotin or n-butyltrichlorotin.

The component (b) is preferably titanium tetrachloride, methyldichloroaluminum, ethyldichloroaluminum, tetrachlorosilane, phenyltrichlorosilane, methyltrichlorosilane, ethyltrichlorosilane, n-propyltrichlorosilane or tetrachlorotin, and particularly preferably titanium tetrachloride or tetrachlorosilane, from a viewpoint of a polymerization activity and a stereoregularity of a catalyst produced.

The above-exemplified compounds as the component (b) are used singly, or in combination of two or more thereof.

The above-mentioned component (e) is preferably an ether. Examples thereof are a dialkyl ether and a cyclic ether, which may be used in combination of two or more thereof.

Examples of the component (e) are dimethyl ether, diethyl ether, di-n-propyl ether, diisopropyl ether, di-n-butyl ether, diisobutyl ether, methyl-n-propyl ether, methyl-n-butyl ether, ethyl-n-propyl ether, ethyl-n-butyl ether, methyl cyclohexyl ether, trimethylene oxide, tetrahydrofuran, 2,5-dimethoxytetrahydrofuran, tetrahydropyrane, hexamethylene oxide, 1,3-dioxepane, 1,3-dioxane, 1,4-dioxane, 1,3-dioxolane, 2-methyl-1,3-dioxolane, 2,2-dimethyl-1,3-dioxolane, 4-methyl-1,3-dioxolane, 2,4-dimethyl-1,3-dioxolane, furan, 2,5-dimethylfuran and s-trioxane. Among them, preferred is di-n-butyl ether. In the present invention, "di-n-butyl ether" is hereinafter referred to as "dibutyl ether".

In the above-mentioned process (5) for producing the component (A), the above-mentioned components (a), (b), (c), (d) and (e) (optional component) are contacted with one another usually in an atmosphere of an inert gas such as argon. Examples of a method for contacting those components are the following methods (1) to (12):

(1) a method comprising the step of adding the components (b), (c) and (d) to the component (a) in an optional order;

(2) a method comprising the step of adding (i) a mixture of the component (b) with the component (d), and (ii) the component (c) to the component (a) in an optional order;

(3) a method comprising the step of adding (i) the component (b), and (ii) a mixture of the component (c) with the component (d) to the component (a) in an optional order;

(4) a method comprising the step of adding the components (a), (b) and (c) to the component (d) in an optional order;

(5) a method comprising the step of adding the components (a) and (c) to a mixture of the component (b) with the component (d) in an optional order;

(6) a method comprising the step of adding the components (a) and (b) to a mixture of the component (c) with the component (d) in an optional order;

(7) a method comprising the step of adding the component (a) to a mixture of the components (b), (c) and (d);

(8) a method comprising the steps of (i) adding the component (c) to the component (a), and then, (ii) adding the components (b) and (d) in an optional order;

(9) a method comprising the steps of (i) adding the components (c) and (d) to the component (a) in an optional order, and then, (ii) adding the component (b);

(10) a method comprising the steps of (i) adding the components (b), (c) and (d) to the component (a) in an optional order, and then, (ii) further adding the component (b);

(11) a method comprising the steps of (i) adding the components (b), (c) and (d) to the component (a) in an optional order, and then, (ii) further adding a mixture of the component (b) with the component (c); and

(12) a method, wherein the component (b) in any method mentioned above is replaced with a mixture of the component (b) with the component (e).

From a viewpoint of a polymerization activity of a catalyst produced, more preferred is the component (A) produced by further contacting one or more times (i) a solid obtained by any method mentioned above with (ii) the component (b) or a mixture of the component (b) with the component (e).

Among them, preferred is the following method (13), more preferred is the following method (14), and further preferred is the following method (15), which all use the component (e):

(13) a method comprising the steps of (i) adding the components (c) and (d), and a mixture of the component (b) with the component (e) to the component (a) in an optional order, and then, (ii) further adding one or more times a mixture of the component (b) with the component (e);

(14) a method comprising the steps of (i) adding the components (c) and (d), and a mixture of the component (b) with the component (e) to the component (a) in an optional order, and then, (ii) further adding one or more times a mixture of the components (b), (c) and (e); and

(15) a method comprising the steps of (i) adding the components (c) and (d), and a mixture of the component (b) with the component (e) to the component (a) in an optional order, (ii) further adding a mixture of the components (b), (c) and (e); and then (iii) still further adding one or more times a mixture of the component (b) with the component (e).

A method for contacting the components (a), (b), (c), (d) and (e) with one another is not particularly limited. Examples thereof are conventional methods such as a slurry method, and a mechanically pulverizing method (for example, a method using a ball mill). The mechanically pulverizing method is not preferable from an industrial point of view, because said method may result in a generation of a large amount of fine powder contained in the component (A) obtained, and as a result, the component (A) may be broad in its particle size distribution. Therefore, preferred is a method for contacting them in the presence of a diluent.

Although a mixture itself obtained by contacting the components (a), (b), (c), (d) and (e) with one another can be used for a next operation, preferred is to separate a solid contained in the mixture from a liquid contained therein, and more preferred is to wash the separated solid with a diluent.

The above-mentioned diluent is preferably inert to a substance to be treated. Examples of the diluent are an aliphatic hydrocarbon such as pentane, hexane, heptane and octane; an aromatic hydrocarbon such as benzene, toluene and xylene; an alicyclic hydrocarbon such as cyclohexane and cyclopentane; and a halogenated hydrocarbon such as 1,2-dichloroethane and monochlorobenzene.

In the above-mentioned method for contacting the components (a), (b), (c), (d) and (e) with one another in the presence of a diluent, and in the above-mentioned washing the separated solid with a diluent, the diluent is used in an amount of usually 0.1 to 1,000 ml, and preferably 1 to 100 ml, per 1 g of the component (a), and per one time contacting, or per one time washing. The above-mentioned washing the separated solid with a diluent is carried out usually one to five times per one time contacting.

The above-mentioned contacting and washing are carried out at usually −50 to 150° C., preferably 0 to 140° C., and further preferably 60 to 135° C. A time for the contacting is not particularly limited, and is preferably 0.5 to 8 hours, and further preferably 1 to 6 hours. A time for the washing is not particularly limited, and is preferably 1 to 120 minutes, and further preferably 2 to 60 minutes.

The above-mentioned component (c) is used in an amount of preferably 1 to 25% by weight, and more preferably 2 to 20% by weight, in terms of an amount of a phthalic acid ester compound contained in the component (A) produced. Said amount used corresponds to usually 0.1 to 100 mmol, preferably 0.3 to 50 mmol, and more preferably 0.5 to 20 mmol, per 1 g of the component (a) used; and usually 0.01 to 1.0 mol, and preferably 0.03 to 0.5 mol, per 1 gram atom of a magnesium atom contained in the component (a) used.

The component (d) is used in an amount of preferably 0.5 to 20% by weight, and more preferably 0.8 to 10% by weight, in terms of an amount of the component (d) contained in the component (A) produced. Said amount used corresponds to usually 0.01 to 100 mmol, preferably 0.015 to 50 mmol, and further preferably 0.02 to 10 mmol, per 1 g of the component (a) used; and usually 0.001 to 1.0 mol, and preferably 0.002 to 0.5 mol, per 1 gram atom of a magnesium atom contained in the component (a) used.

Each of the components (c) and (d) is used in an amount of preferably 0.1 to 3, more preferably 0.13 to 2, and further preferably 0.15 to 1.5, in terms of a ratio of a molar amount of the component (d) contained in the component (A) produced to a molar amount of a phthalic acid ester compound contained therein. When said ratio is less than 0.1, it may be difficult to control a molecular weight with hydrogen, and when said ratio is more than 3, an α-olefin polymer produced may have a poor stereoregularity.

From a viewpoint of a stereoregularity of an α-olefin polymer produced, a total of an amount of a phthalic acid ester compound contained in the component (A) and an amount of the component (d) contained therein is preferably 5 to 30% by weight, more preferably 6 to 26% by weight, and further preferably 7 to 22% by weight, wherein an amount of the component (A) dried is 100% by weight.

The component (b) is used in an amount of usually 0.5 to 1,000 mmol, preferably 1 to 200 mmol, and further preferably 2 to 100 mmol, per 1 g of the component (a) used.

The component (e) is used in an amount of usually 0.01 to 100 mmol, preferably 0.05 to 50 mmol, and further preferably 0.1 to 20 mmol, per 1 g of the component (a) used; and when the component (e) is used in combination with the component (b), the component (e) is used in an amount of usually 1 to 100 mol, preferably 1.5 to 75 mol, and further preferably 2 to 50 mol, per 1 mol of the component (b) used. When said amount is larger than 100 mmol per 1 g of the component (a) used, or larger than 100 mol per 1 mol of the component (b) used, the component (A) may contain collapsed particles.

When using each of the components (a), (b), (c), (d) and (e) two or more times, each of the above-mentioned amounts is that per one time of use thereof.

The component (A) produced is used for polymerization as slurry in combination thereof with an inert diluent, or as a fluid and dried powder. A method for drying the component (A) comprises, for example, the step of removing volatile components contained in the component (A) under a reduced pressure, or under a flow of an inert gas such as nitrogen and argon. The drying is carried out at preferably 0 to 200° C., and more preferably 50 to 100° C., for preferably 0.01 to 20 hours, and more preferably 0.5 to 10 hours.

The above-mentioned component (B) is a compound having one or more aluminum-carbon bonds in its molecule. Examples thereof are compounds represented by the following formulas, respectively:

$R^{19}{}_w AlY_{3-w}$, and $R^{20}R^{21}Al—O—AlR^{22}R^{23}$, wherein $R^{19}$ to $R^{23}$ are independently of one another a hydrocarbon group having 1 to 20 carbon atoms; Y is a halogen atom, a hydrogen atom or an alkoxy group; and w is an integer satisfying $2 \leq w \leq 3$.

Examples of the component (B) are a trialkylaluminum such as triethylaluminum, triisobutylaluminum and trihexylaluminum; a dialkylaluminum hydride such as diethylaluminum hydride and diisobutylaluminum hydride; a dialkylaluminum halide such as diethylaluminum chloride; a mixture of a trialkylaluminum and a dialkylaluminum halide such as a mixture of triethylaluminum and diethylaluminum chloride; and an alkylalumoxane such as tetraethyldialumoxane and tetrabutyldialumoxane.

Among them, preferred is a trialkylaluminum, a mixture of a trialkylaluminum with a dialkylaluminum halide, or an alkylalumoxane; and particularly preferred is triethylaluminum, triisobutylaluminum, a mixture of triethylaluminum with diethylaluminum chloride, or tetraethyldialumoxane.

Examples of the above-mentioned component (C) are an oxygen-containing compound, a nitrogen-containing compound, a phosphorus-containing compound and a sulfur-containing compound. Among them, preferred is an oxygen-containing compound or a nitrogen-containing compound. Examples of the oxygen-containing compound are an alkoxysilicon compound, an ether, an ester and a ketone, and among them, preferred is an alkoxysilicon compound or an ether.

An example of the above-mentioned alkoxysilicon compound is a compound represented by the following formula:

$R^3{}_r Si(OR^4)_{4-r}$ wherein $R^3$ is a hydrocarbon group having 1 to 20 carbon atoms, a hydrogen atom, or a hetero atom-containing group, and when plural $R^3$s exist, they are the same as, or different from one another; $R^4$ is a hydrocarbon group having 1 to 20 carbon atoms, and when plural $R^4$s exist, they are the same as, or different from one another; and r is an integer satisfying $0 \leq r < 4$.

Examples of the hydrocarbon group of $R^3$ in the above formula are a straight-chain alkyl group such as a methyl group, an ethyl group, a propyl group, a butyl group and a pentyl group; a branched-chain alkyl group such as an isopropyl group, a sec-butyl group, a tert-butyl group and a tert-amyl group; a cycloalkyl group such as a cyclopentyl group and a cyclohexyl group; a cycloalkenyl group such as a cyclopentenyl group; and an aryl group such as a phenyl group and a tolyl group. Among compounds represented by the above formula, preferred is a compound having one or more hydrocarbon groups, whose carbon atoms linked directly to the silicon atom are secondary or tertiary carbon atoms.

Examples of the hetero atom contained in the hetero atom-containing group of $R^3$ in the above formula are an oxygen atom, a nitrogen atom, a sulfur atom and a phosphorus atom. Specific examples of the hetero atom-containing group are a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydrocarbazolyl group, a perhydroacridinyl group, a furyl group, a pyranyl group, a perhydrofuryl group and a thienyl group. Among compounds represented by the above formula, preferred is a compound, whose hetero atom contained in the hetero atom-containing group is linked directly to the silicon atom.

Examples of the alkoxysilicon compound represented by the above formula are diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicylohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane and (perhydroisoquinolino)(tert-butyl)dimethoxysilane.

Examples of the above-mentioned ether are those exemplified above as the components (d) and (e), and a cyclic ether compound. Said cyclic ether compound means a heterocyclic compound containing one or more —C—O—C— bonds in its ring.

Examples of the cyclic ether compound are ethylene oxide, propylene oxide, trimethylene oxide, tetrahydrofuran, 2,5-dimethoxytetrahydrofuran, tetrahydropyrane, hexamethylene oxide, 1,3-dioxepane, 1,3-dioxane, 1,4-dioxane, 1,3-dioxolane, 2-methyl-1,3-dioxolane, 2,2-dimethyl-1,3-dioxolane, 4-methyl-1,3-dioxolane, 2,4-dimethyl-1,3-dioxolane, furan, 2,5-dimethylfuran and s-trioxane. Among them, preferred is a cyclic ether compound containing one or more —C—O—C—O—C— bonds in its ring.

Examples of the above-mentioned nitrogen-containing compound are 2,6-substituted piperidines such as 2,6-dimethylpiperidine and 2,2,6,6-tetramethylpiperidine; substituted methylene diamines such as 2,5-substituted piperidines, N,N,N',N'-tetramethylmethylene diamine and N,N,N',N'-tetraethylmethylene diamine; and substituted imidazolidines such as 1,3-dibenzylimidazolidine.

The component (C) is particularly preferably cyclohexylmethyldimethoxysilane, cyclohexylethyldimethoxysilane, diisopropyldimethoxysilane, tert-butylethyldimethoxysilane, tert-butyl-n-propyldimethoxysilane, diphenyldimethoxysilane, dicyclobutyldimethoxysilane, dicyclopentyldimethoxysilane, 1,3-dioxolane, 1,3-dioxane, 2,6-dimethylpiperidine, 2,2,6,6-tetramethylpiperidine, 2-isopropyl-2-isobutyl-1,3-dimethoxypropane, 2-isopropyl-2-isopentyl-1,3-dimethoxypropane, 2,2-diisobutyl-1,3-dimethoxypropane, 2,2-diisopropyl-1,3-dimethoxypropane or 2,2-dicyclohexyl-1,3-dimethoxypropane.

An α-olefin used in the process for producing an α-olefin polymer according to the present invention is an α-olefin having three or more carbon atoms. Examples of the α-olefin are a straight-chain mono-olefin such as propylene, butene-1, pentene-1, hexene-1, heptene-1, octene-1 and decene-1; a branched-chain mono-olefin such as 3-methylbutene-1, 3-methylpentene-1 and 4-methylpentene-1; vinylcyclohexane; and a combination of two or more thereof. Among them, preferred is a homopolymer of propylene or butene-1, or a copolymer having a propylene unit or a butene-1 unit as a major unit; and particularly preferred is a homopolymer of propylene, or a copolymer having a propylene unit as a major unit. In the present invention, there may be used a combination of two or more monomers selected from the group consisting of the above-mentioned α-olefins and ethylene. Said selected monomers may be combined with a compound having two or more unsaturated bonds such as a conjugated diene compound and a non-conjugated diene compound. In the process for producing an α-olefin polymer according to the present invention, there may easily be carried out a hetero-block copolymerization having two or more polymerization steps.

In the process for producing a catalyst for α-olefin polymerization according to the present invention, a method for contacting the components (A), (B) and (C) with one another is not limited. Examples thereof are (1) a method comprising the steps of (i) contacting those components with one another in a reactor for producing a catalyst in the presence or absence of a solvent, and then (ii) feeding the catalyst to a polymerization reactor, and (2) a method comprising the steps of (i) feeding those components separately to a polymerization reactor, and then (ii) contacting them with one another in the polymerization reactor. The components (A), (B) and (C) are fed to a polymerization reactor preferably in an atmosphere of an inert gas free from moisture such as nitrogen and argon. Any two components of the components (A), (B) and (C) may be contacted with each other prior to feeding to a polymerization reactor.

In polymerization of an α-olefin in the process for producing an α-olefin polymer according to the present invention, wherein said polymerization is referred to as "real polymerization", (1) the component (A) itself of the present invention is used, or (2) a pre-polymerized catalyst component produced according to the following method using the component (A) is used in place of the component (A).

In general, said pre-polymerized catalyst component is preferably produced by slurry-polymerization of a small amount of an olefin in the presence of the components (A) and (B). An example of a solvent used for said slurry-polymerization is an inert hydrocarbon such as propane, butane, isobutane, pentane, isopentane, hexane, heptane, octane, cyclohexane, benzene and toluene. A partial or total amount of said inert hydrocarbon used therefore may be replaced with a liquid olefin.

In said slurry-polymerization, the component (B) is used in an amount of usually 0.5 to 700 mol, preferably 0.8 to 500 mol, and particularly preferably 1 to 200 mol, per one gram atom of a titanium atom contained in the component (A) used.

The above-mentioned olefin is pre-polymerized in an amount of usually 0.01 to 1,000 g, preferably 0.05 to 500 g, and particularly preferably 0.1 to 200 g, per 1 g of the component (A) used.

A concentration of a slurry in the above-mentioned slurry-polymerization is preferably 1 to 500 g-component (A)/liter-solvent, and particularly preferably 3 to 300 g-component (A)/liter-solvent. A pre-polymerization temperature is preferably −20 to 100° C., and particularly preferably 0 to 80°. A partial pressure of an olefin contained in a gas phase in the pre-polymerization is preferably 1 kPa to 2 MPa, and particularly preferably 10 kPa to 1 MPa, except an olefin, which is liquid under a condition of the pre-polymerization such as a pressure and temperature. A pre-polymerization time is not particularly limited, and is, in general, suitably 2 minutes to 15 hours.

Examples of a method for supplying the components (A) and (B) and an olefin to a pre-polymerization reactor are (1) a method comprising the steps of (i) supplying those components, and then (ii) supplying an olefin, and (2) a method comprising the steps of (i) supplying the component (A) and an olefin, and then (ii) supplying the component (B). Examples of a method for supplying an olefin to a pre-polymerization reactor are (1) a method comprising the step of supplying an olefin one after another while keeping an inner pressure of the reactor at a predetermined pressure, and (2) a method comprising the step of supplying the predetermined total amount of an olefin at the beginning. In order to control a molecular weight of an obtained pre-polymer, it is possible to add a chain transfer agent such as hydrogen to a pre-polymerization reactor.

A partial or total amount of the component (C), which is to be used in the above-mentioned real polymerization, may be used in the pre-polymerization. In the pre-polymerization, the component (C) is used in an amount of usually 0.01 to 400 mol, preferably 0.02 to 200 mol, and particularly preferably 0.03 to 100 mol, per one gram atom of a titanium atom contained in the component (A) used; and in an amount of usually 0.003 to 5 mol, preferably 0.005 to 3 mol, and particularly preferably 0.01 to 2 mol, per 1 mol of the component (B) used.

In the pre-polymerization, a method for supplying the component (C) to a pre-polymerization reactor is not particularly limited. Examples thereof are (1) a method comprising the step of supplying the components (C) and (B) thereto separately, and (2) a method comprising the steps of (i) contacting those components with each other to form a contact product, and then (ii) supplying the contact product to a pre-polymerization reactor. An olefin used for the pre-polymerization is the same as, or different from that used for the real polymerization.

In the real polymerization, the component (B) is used in an amount of usually 1 to 1,000 mol, and particularly preferably 5 to 600 mol, per one gram atom of a titanium atom contained in the component (A) used.

In the real polymerization, the component (C) is used in an amount of usually 0.1 to 2,000 mol, preferably 0.3 to 1,000 mol, and particularly preferably 0.5 to 800 mol, per one gram atom of a titanium atom contained in the component (A) used; and in an amount of usually 0.001 to 5 mol, preferably 0.005 to 3 mol, and particularly preferably 0.01 to 1 mol, per 1 mol of the component (B) used.

The real polymerization is carried out (1) at usually −30 to 300° C., and preferably 20 to 180° C., (2) under a pressure, which is not particularly limited, of usually an atmospheric pressure to 10 MPa, and preferably 200 kPa to 5 MPa, from an industrial point and an economical point of view, (3) according to a batchwise method or a continuous method, and (4) according to (i) a slurry or solution polymerization method with an inert hydrocarbon solvent such as propane, butane, isobutane, pentane, hexane, heptane and octane, (ii) a bulk polymerization method using an olefin as a solvent, which olefin is liquid at a polymerization temperature, or (iii) a gas-phase polymerization method. In order to control a molecular weight of a homopolymer or copolymer produced, it is possible to supply a chain transfer agent such as hydrogen to a polymerization reactor.

EXAMPLE

The present invention is explained in more detail with reference to the following Examples, which do not limit the present invention.

Example 1

(1) Production of the Component (a)

A reactor equipped with a stirrer was purged with nitrogen, and thereinto, 800 liters of hexane, 6.8 kg of diisobutyl phthalate, 350 kg of tetraethoxysilane and 38.8 kg of tetrabutoxytitanium were put, and a resultant mixture was stirred. To the mixture maintained at 7° C. (temperature of a reactor), 900 liters of a dibutyl ether solution (concentration: 2.1 mol/liter) of butylmagnesium chloride was added dropwise over 5 hours. The obtained mixture was stirred at 20° C. for one hour, and a reaction mixture was filtered to separate a solid. The separated solid was washed three times with each 1,100 liters of toluene. To the washed solid, toluene was added to obtain 625 liters of a slurry thereof. The slurry was stirred at 70° C. for 1 hour, and then, was cooled to a room temperature.

A part of the slurry was sampled, and was filtered to separate a solid, which was washed with hexane at a room temperature, and was dried under a reduced pressure, thereby obtaining a solid component. An elemental analysis measured by the below-explained method of the solid component (component (a)) showed a content of a titanium atom of 2.11% by weight, that of an ethoxy group of 38.9% by weight, and that of a butoxy group of 3.39% by weight.

(2) Production of the Component (A)

A 100 ml-flask equipped with a stirrer, a dropping funnel and a thermometer was purged with nitrogen. Thereinto, the slurry obtained in the above (1) containing 8 g of the component (a) was put, and a supernatant liquid thereof was taken out to become a total volume of the slurry of 26.5 mml. To the slurry, 0.75 ml of 2-isopropyl-2-isobutyl-1,3-dimethoxypropane was added, and the resultant mixture was stirred at 40° C., for 15 minutes. To the mixture, a mixture of 16.0 ml of titanium tetrachloride and 0.8 ml of dibutyl ether was added. To the obtained mixture, a mixture of 1.6 ml of phthalic acid chloride and 1.6 ml of toluene was added dropwise over 5 minutes. The resultant mixture was stirred at 115° C. for 3 hours, and then, the obtained reaction mixture was filtered at 115° C. to separate a solid. The separated solid was washed three times at 115° C. with each 40 ml of toluene.

To the washed solid, toluene was added to obtain 26.5 ml of a slurry thereof. To the slurry, a mixture of 0.8 ml of dibutyl ether, 0.45 ml of diisobutyl phthalate and 6.4 ml of titanium tetrachloride was added, and the resultant mixture was stirred at 105° C. for 1 hour. The obtained reaction mixture was filtered at 105° C. to separate a solid, and the separated solid was washed two times at 105° C. with each 40 ml of toluene.

To the washed solid, toluene was added to obtain 26.5 ml of a slurry thereof, and the obtained slurry was heated to 105° C. To the slurry, a mixture of 0.8 ml of dibutyl ether and 6.4 ml of titanium was added, and the resultant mixture was stirred at 105° C. for 1 hour. The obtained reaction mixture was filtered at 105° C. to separate a solid, and the separated solid was washed two times at 105° C. with each 40 ml of toluene.

To the washed solid, toluene was added to obtain 26.5 ml of a slurry thereof, and the obtained slurry was heated to 105° C. To the slurry, a mixture of 0.8 ml of dibutyl ether and 6.4 ml of titanium was added, and the resultant mixture was stirred at 105° C. for 1 hour. The obtained reaction mixture was filtered at 105° C. to separate a solid, and the separated solid was washed three times at 105° C. with each 40 ml of toluene, and further washed three times at a room temperature with each 40 ml of hexane. The washed solid was dried under a reduced pressure to obtain the component (A).

An elemental analysis of the component (A) showed a content of a titanium atom of 2.02% by weight, that of phthalic acid ester compounds of 10.6% by weight (diethyl phthalate: 7.7% by weight, ethyl-n-butyl phthalate: 0.80% by weight, and diisobutyl phthalate: 2.0% by weight), and that of 2-isopropyl-2-isobutyl-1,3-dimethoxypropane (1,3-diether compound) of 3.8% by weight. A molar ratio of the content of 2-isopropyl-2-isobutyl-1,3-dimethoxypropane to that of the phthalic acid ester compounds was 0.42.

(3) Polymerization of Propylene

A 3-liter stainless steel autoclave was purged with argon. Thereinto, 2.6 mmol of triethylaluminum (component (B)), 0.52 mmol of tert-butyl-n-propyldimethoxysilane (component (C)), and 5.41 mg of the component (A) obtained in the above (2) were put, and then, 15.4 liters (under standard conditions) of hydrogen was further added thereto.

Into the autoclave, 780 g of a liquefied propylene was fed, and then, it was polymerized at 80° C. for one hour, and thereafter, the unpolymerized propylene was purged. The resultant polymer was dried under a reduced pressure to obtain 311 g of a polypropylene powder.

A yield of the obtained polypropylene per 1 g of the component (A), which is referred to as "PP/cat", was 57,500 g/g. The polypropylene had (i) a component soluble at 20° C. in xylene of 0.51% by weight, wherein a total amount of the polypropylene is 100% by weight, said component being referred to as "CXS" (Cold Xylene Soluble component) measured by the below-explained method, (ii) an intrinsic viscosity, [η], of 0.76 dl/g, and (iii) a bulk density of 0.414 g/ml.

Results are summarized in Table 1.

The above-mentioned content of a titanium atom was measured according to a method comprising the steps of:

(1) decomposing about 20 mg of a solid sample with a one normal (1 N) sulfuric acid solution, (2) adding 3 ml (excess amount) of a hydrogen peroxide aqueous solution (concentration: 3% by weight) thereto to obtain a liquid sample, (3) measuring a 410 nm characteristic absorption of the liquid sample with a double beam spectrophotometer, U-2001, manufactured by Hitachi, Ltd., and (4) finding a content of a titanium atom from the obtained characteristic absorption and a calibration curve prepared in advance.

The above-mentioned content of an alkoxy group was measured according to a method comprising the steps of:
(1) decomposing about 2 g of a solid sample with 100 ml of water to obtain a liquid sample,
(2) measuring an amount of an alcohol corresponding to an alkoxy group contained in the liquid sample according to a gas chromatography internal standard method, and
(3) converting the obtained amount of an alcohol to a content of an alkoxy group.

The above-mentioned content of a phthalic acid ester compound, and that of a 1,3-diether compound were measured according to a method comprising the steps of:
(1) dissolving about 30 mg of a solid sample in 100 ml of N,N-dimethylacetamide to obtain a solution, and
(2) measuring a content of a phthalic acid ester compound contained in the solution, and that of a 1,3-diether compound contained therein according to a gas chromatography internal standard method, The above-mentioned CXS was measured according to a method comprising the steps of:
(1) dissolving 1 g of the obtained polymer in 200 ml of a boiling xylene,
(2) cooling the obtained solution gradually to 50° C.,
(3) cooling the solution under stirring with an ice-water bath to 20° C.,
(4) allowing the solution to stand at 20° C. for 3 hours, thereby precipitating a polymer,
(5) filtering off the precipitated polymer to obtain a filtrate, and
(6) weighing a polymer contained in the filtrate, which polymer is the above-mentioned component soluble at 20° C. in xylene, wherein the smaller the CXS value is, the higher stereoregularity the polymer has.

The above-mentioned intrinsic viscosity, [η], was measured at 135° C. using TETRALINE (tetrahydronaphthalene) as a solvent.

The above-mentioned bulk density was measured according to JIS K-6721-1966, wherein "JIS" means "Japanese Industrial Standards".

Example 2

(1) Production of the Component (A)

Example 1 (2) was repeated except that the amount of 2-isopropyl-2-isobutyl-1,3-dimethoxypropane used was changed to 1.5 ml.

An elemental analysis of the obtained component (A) showed a content of a titanium atom of 1.93% by weight, that of phthalic acid ester compounds of 9.6% by weight, and that of 2-isopropyl-2-isobutyl-1,3-dimethoxypropane of 7.2% by weight. A molar ratio of the content of 2-isopropyl-2-isobutyl-1,3-dimethoxypropane to that of the phthalic acid ester compounds was 0.87.

(2) Polymerization of Propylene

Example 1 (3) was repeated except that 5.41 mg of the component (A) was changed to 6.76 mg of the component (A) produced in the above Example 2 (1), thereby obtaining 327 g of a polypropylene powder.

PP/cat was 48,400 g/g, and the obtained polypropylene had CXS of 0.48% by weight, [η] of 0.74 dl/g, and a bulk density of 0.417 g/ml.

Results are summarized in Table 1.

Example 3

(1) Polymerization of Propylene

A 3-liter stainless steel autoclave was purged with argon. Thereinto, 2.6 mmol of triethylaluminum (component (B)), 0.26 mmol of cyclohexylethyldimethoxysilane (component (C)), and 7.68 mg of the component (A) produced in Example 1 (2) were put, and then, hydrogen corresponding to a partial pressure of 0.033 MPa was added thereto.

Into the autoclave, 780 g of a liquefied propylene was fed, and then, it was polymerized at 80° C. for one hour, and thereafter, the unpolymerized propylene was purged. The resultant polymer was dried under a reduced pressure to obtain 356 g of a polypropylene powder.

PP/cat was 46,400 g/g, and the obtained polypropylene had CXS of 0.39% by weight, [η] of 1.95 dl/g, and a bulk density of 0.427 g/ml.

Results are summarized in Table 1.

Example 4

(1) Polymerization of Propylene

Example 3 (1) was repeated except that 7.68 mg of the component (A) was changed to 7.48 mg of the component (A) produced in the above Example 2 (1), thereby obtaining 286 g of a polypropylene powder.

PP/cat was 38,200 g/g, and the obtained polypropylene had CXS of 0.42% by weight, [η] of 1.83 dl/g, and a bulk density of 0.431 g/ml.

Results are summarized in Table 1.

Example 5

(1) Production of the Component (A)

Example 1 (2) was repeated except that an amount of 2-isopropyl-2-isobutyl-1,3-dimethoxypropane was changed to 0.25 ml thereof, thereby obtaining the component (A).

An elemental analysis of the component (A) showed a content of a titanium atom of 1.95% by weight, that of phthalic acid ester compounds of 12.1% by weight, and that of 2-isopropyl-2-isobutyl-1,3-dimethoxypropane of 1.5% by weight. A molar ratio of the content of 2-isopropyl-2-isobutyl-1,3-dimethoxypropane to that of the phthalic acid ester compounds was 0.14.

(2) Polymerization of Propylene

Example 3 (1) was repeated except that 7.68 mg of the component (A) was changed to 6.79 mg of the component (A) produced in the above Example 5 (1), thereby obtaining 377 g of a polypropylene powder.

PP/cat was 55,500 g/g, and the obtained polypropylene had CXS of 0.41% by weight, [η] of 2.01 dl/g, and a bulk density of 0.428 g/ml.

Results are summarized in Table 1.

Example 6

(1) Production of the Component (A)

A 100 ml-flask equipped with a stirrer, a dropping funnel and a thermometer was purged with nitrogen. Thereinto, the slurry produced in Example 1 (1) containing 8 g of the component (a) was put, and a supernatant liquid thereof was taken out to become a total volume of the slurry of 26.5 mml. The slurry was heated to 40° C., and a mixture of 16.0 ml of titanium tetrachloride and 0.8 ml of dibutyl ether was added thereto. To the obtained mixture, a mixture of 1.6 ml of phthalic acid chloride and 1.6 ml of toluene was added dropwise over 5 minutes, and then, 0.5 ml of 2-isopropyl-2-isobutyl-1,3-dimethoxypropane was added thereto.

All post-treatments of the resultant mixture (such as stirring, heating, filtering, separating, washing, slurrying and drying) were the same as those conducted in Example 1 (2), thereby obtaining the component (A).

An elemental analysis of the component (A) showed a content of a titanium atom of 1.91% by weight, that of phthalic acid ester compounds of 11.5% by weight, and that of 2-isopropyl-2-isobutyl-1,3-dimethoxypropane of 2.4% by weight. A molar ratio of the content of 2-isopropyl-2-isobutyl-1,3-dimethoxypropane to that of the phthalic acid ester compounds was 0.24.

(2) Polymerization of Propylene

Example 3 (1) was repeated except that 7.68 mg of the component (A) was changed to 6.62 mg of the component (A) produced in the above Example 6 (1), thereby obtaining 354 g of a polypropylene powder.

PP/cat was 53,500 g/g, and the obtained polypropylene had CXS of 0.37% by weight, [η] of 2.00 dl/g, and a bulk density of 0.447 g/ml.

Results are summarized in Table 1.

Example 7

(1) Production of the Component (A)

A 100 ml-flask equipped with a stirrer, a dropping funnel and a thermometer was purged with nitrogen. Thereinto, the slurry produced in Example 1 (1) containing 8 g of the component (a) was put, and a supernatant liquid thereof was taken out to become a total volume of the slurry of 26.5 mml. The slurry was heated to 40° C., and a mixture of 16.0 ml of titanium tetrachloride and 0.8 ml of dibutyl ether was added thereto. To the obtained mixture, a mixture of 1.6 ml of phthalic acid chloride and 1.6 ml of toluene was added dropwise over 5 minutes, and then, the reaction mixture was stirred at 115° C. for 3 hours. The obtained reaction mixture was filtered at 115° C. to separate a solid. The separated solid was washed three times at 115° C. with each 40 ml of toluene.

To the washed solid, toluene was added to obtain 26.5 ml of a slurry thereof. To the slurry, a mixture of 0.4 ml of 2-isopropyl-2-isobutyl-1,3-dimethoxypropane, 0.8 ml of dibutyl ether, 0.45 ml of diisobutyl phthalate and 6.4 ml of titanium tetrachloride was added, and the resultant mixture was stirred at 105° C. for 1 hour. The obtained reaction mixture was filtered at 105° C. to separate a solid, and the separated solid was washed two times at 105° C. with each 40 ml of toluene.

To the washed solid, toluene was added to obtain 26.5 ml of a slurry thereof, and the obtained slurry was heated to 105° C. To the slurry, a mixture of 0.8 ml of dibutyl ether and 6.4 ml of titanium was added, and the resultant mixture was stirred at 105° C. for 1 hour. The obtained reaction mixture was filtered at 105° C. to separate a solid, and the separated solid was washed two times at 105° C. with each 40 ml of toluene.

To the washed solid, toluene was added to obtain 26.5 ml of a slurry thereof, and the obtained slurry was heated to 105° C. To the slurry, a mixture of 0.8 ml of dibutyl ether and 6.4 ml of titanium was added, and the resultant mixture was stirred at 105° C. for 1 hour. The obtained reaction mixture was filtered at 105° C. to separate a solid, and the separated solid was washed three times at 105° C. with each 40 ml of toluene, and further washed three times at a room temperature with each 40 ml of hexane. The washed solid was dried under a reduced pressure to obtain the component (A).

An elemental analysis of the component (A) showed a content of a titanium atom of 1.86% by weight, that of phthalic acid ester compounds of 11.6% by weight, and that of 2-isopropyl-2-isobutyl-1,3-dimethoxypropane of 3.4% by weight. A molar ratio of the content of 2-isopropyl-2-isobutyl-1,3-dimethoxypropane to that of the phthalic acid ester compounds was 0.34.

(2) Polymerization of Propylene

Example 3 (1) was repeated except that 7.68 mg of the component (A) was changed to 6.31 mg of the component (A) produced in the above Example 7 (1), thereby obtaining 213 g of a polypropylene powder.

PP/cat was 33,800 g/g, and the obtained polypropylene had CXS of 0.39% by weight, [η] of 1.95 dl/g, and a bulk density of 0.442 g/ml.

Results are summarized in Table 1.

Example 8

(1) Production of the Component (a)

A reactor equipped with a stirrer was purged with nitrogen, and thereinto, 670 liters of hexane, 14.5 kg of diisobutyl phthalate, 350 kg of tetraethoxysilane and 38.0 kg of tetrabutoxytitanium were put, and a resultant mixture was stirred. To the mixture heated at 8° C., 900 liters of a dibutyl ether solution (concentration: 2.1 mol/liter) of butylmagnesium chloride was added dropwise over 5 hours. The obtained mixture was stirred at 20° C. for one hour, and a reaction mixture was filtered to separate a solid. The separated solid was washed three times with each 1,100 liters of toluene. To the washed solid, toluene was added to obtain 625 liters of a slurry thereof.

A part of the slurry was sampled, and was filtered to separate a solid, which was washed with hexane at a room temperature, and was dried under a reduced pressure, thereby obtaining a solid component. An elemental analysis of the solid component (component (a)) showed a content of a titanium atom of 1.98% by weight, that of an ethoxy group of 37.4% by weight, and that of a butoxy group of 2.8% by weight.

(2) Production of the Component (A)

A 200 ml-flask equipped with a stirrer, a dropping funnel and a thermometer was purged with nitrogen. Thereinto, the slurry obtained in the above (1) containing 10 g of the component (a) was put, and toluene was added thereto, thereby obtaining 80 ml of a slurry. To the slurry, 0.40 ml of 2-isopropyl-2-isobutyl-1,3-dimethoxypropane was added, and the resultant mixture was stirred at a room temperature for 15 minutes. To the mixture, 20 ml of titanium tetrachloride was added, and to the resultant mixture heated to 80° C., 3.2 ml of di-n-butyl phthalate was further added. The obtained reaction mixture was stirred at 110° C. for 2 hours, and then, was filtered at 110° C. to separate a solid. The separated solid was washed two times at 110° C. with each 100 ml of toluene.

To the washed solid, 80 ml of toluene was added, and the resultant mixture was stirred. To the mixture, 20 ml of titanium tetrachloride was added, and the resultant mixture was stirred at 100° C. for two hours. The obtained mixture was filtered at 100° C. to separate a solid, and the separated solid was washed two times at 100° C. with each 100 ml of toluene.

To the washed solid, 80 ml of toluene was added, and the resultant mixture was stirred. To the obtained mixture, 20 ml of titanium tetrachloride was added, and the resultant mixture was stirred at 100° C. for one hour. The obtained mixture was filtered at 100° C. to separate a solid, and the separated solid was washed two times at 100° C. with each 100 ml of toluene.

To the washed solid, 80 ml of toluene was added, and the resultant mixture was stirred. To the obtained mixture, 20 ml of titanium tetrachloride was added, and the resultant mixture was stirred at 100° C. for one hour. The obtained mixture was filtered at 100° C. to separate a solid, and the separated solid was washed three times at 100° C. with each 100 ml of toluene, and was further washed two times at a room temperature with each 100 ml of hexane. The washed solid was dried under a reduced pressure to obtain the component (A).

An elemental analysis of the component (A) showed a content of a titanium atom of 1.84% by weight, that of phthalic acid ester compounds of 12.7% by weight (diethyl phthalate: 0.4% by weight, ethyl-n-butyl phthalate: 0.6% by weight, and di-n-butyl phthalate: 11.7% by weight), and that of 2-isopropyl-2-isobutyl-1,3-dimethoxypropane (1,3-diether compound) of 2.5% by weight. A molar ratio of the content of 2-isopropyl-2-isobutyl-1,3-dimethoxypropane to that of the phthalic acid ester compounds was 0.27.

(3) Polymerization of Propylene

Example 3 (1) was repeated except that the component (A) was changed to 6.48 mg of the component (A) produced in the above Example 8 (2), thereby obtaining 390 of a polypropylene powder.

PP/cat was 60,200 g/g, and the obtained polypropylene had CXS of 0.65% by weight, [η] of 1.89 dl/g, and a bulk density of 0.436 g/ml.

Results are summarized in Table 2.

Example 9

(1) Production of the Component (A)

A 200 ml-flask equipped with a stirrer, a dropping funnel and a thermometer was purged with nitrogen. Thereinto, 8.60 g of diethoxymagnesium was put, and then, 75 ml of toluene was further put thereinto at a room temperature, thereby obtaining a slurry. To the slurry, 0.75 ml of 2-isopropyl-2-isobutyl-1,3-dimethoxypropane was added, and the resultant mixture was stirred at a room temperature for 15 minutes. To the mixture, 21.5 ml of titanium tetrachloride was added, and to the resultant mixture heated to 80° C., 3.2 ml of di-n-butyl phthalate was further added. The obtained reaction mixture was stirred at 110° C. for 2 hours, and then, was filtered at 110° C. to separate a solid. The separated solid was washed two times at 110° C. with each 80 ml of toluene.

To the washed solid, 75 ml of toluene was added, thereby obtaining a slurry. To the slurry, 21.5 ml of titanium tetrachloride was added, and the resultant mixture was stirred at 110° C. for one hour. The obtained mixture was filtered at 110° C. to separate a solid, and the separated solid was washed two times at 110° C. with each 80 ml of toluene.

To the washed solid, 75 ml of toluene was added, thereby obtaining a slurry. To the slurry, 21.5 ml of titanium tetrachloride was added, and the resultant mixture was stirred at 110° C. for one hour. The obtained mixture was filtered at 110° C. to separate a solid, and the separated solid was washed three times at 110° C. with each 80 ml of toluene, and was further washed two times at a room temperature with each 80 ml of hexane. The washed solid was dried under a reduced pressure to obtain the component (A).

An elemental analysis of the component (A) showed a content of a titanium atom of 1.51% by weight, that of phthalic acid ester compounds of 11.2% by weight, and that of 2-isopropyl-2-isobutyl-1,3-dimethoxypropane (1,3-diether compound) of 4.3% by weight. A molar ratio of the content of 2-isopropyl-2-isobutyl-1,3-dimethoxypropane to that of the phthalic acid ester compounds was 0.52.

(2) Polymerization of Propylene

Example 3 (1) was repeated except that the component (A) was changed to 5.64 mg of the component (A) produced in the above Example 9 (1), thereby obtaining 334 of a polypropylene powder.

PP/cat was 59,200 g/g, and the obtained polypropylene had CXS of 0.41% by weight, and [η] of 1.86 dl/g.

Results are summarized in Table 2.

Comparative Example 1

(1) Production of Solid Catalyst Component

Example 1 (2) was repeated except that 2-isopropyl-2-isobutyl-1,3-dimethoxypropane was not used, thereby obtaining a solid catalyst component.

An elemental analysis of the solid catalyst component showed a content of a titanium atom of 2.05% by weight, that of phthalic acid ester compounds of 13.0% by weight, and that of 2-isopropyl-2-isobutyl-1,3-dimethoxypropane of 0% by weight. A molar ratio of the content of 2-isopropyl-2-isobutyl-1,3-dimethoxypropane to that of the phthalic acid ester compounds was 0.

(2) Polymerization of Propylene

Example 1 (3) was repeated except that the component (A) was changed to 5.22 mg of the solid catalyst component obtained in the above Comparative Example 1 (1), thereby obtaining 269 g of a polypropylene powder.

PP/cat was 51,500 g/g, and the obtained polypropylene had CXS of 0.65% by weight, [η] of 0.89 dl/g, and a bulk density of 0.414 g/ml. Said polypropylene had a lower stereoregularity and a higher molecular weight than those of the polypropylene produced in each of Examples 1 and 2 using 2-isopropyl-2-isobutyl-1,3-dimethoxypropane.

Results are summarized in Table 1.

Comparative Example 2

(1) Production of Solid Catalyst Component

Example 1 (2) was repeated except that (i) phthalic acid chloride and diisobutyl phthalate were not used, and (ii) an amount of 2-isopropyl-2-isobutyl-1,3-dimethoxypropane was changed to 1.5 ml, thereby obtaining a solid catalyst component.

An elemental analysis of the solid catalyst component showed a content of a titanium atom of 3.75% by weight, that of phthalic acid ester compounds of 0% by weight, and that of 2-isopropyl-2-isobutyl-1,3-dimethoxypropane of 15.0% by weight.

(2) Polymerization of Propylene

Example 1 (3) was repeated except that the component (A) was changed to 8.12 mg of the solid catalyst component obtained in the above Comparative Example 2 (1), thereby obtaining 193 g of a polypropylene powder.

PP/cat was 23,800 g/g, and the obtained polypropylene had CXS of 2.6% by weight, [η] of 0.48 dl/g, and a bulk density of 0.393 g/ml. Said polypropylene had a remarkably lower stereoregularity than that of the polypropylene produced in each of Examples 1 and 2 using phthalic acid chloride and diisobutyl phthalate.

Results are summarized in Table 1.

Comparative Example 3

(1) Polymerization of Propylene

Example 3 (1) was repeated except that the component (A) was changed to 6.12 mg of the solid catalyst component obtained in the above Comparative Example 1 (1), thereby obtaining 300 g of a polypropylene powder.

PP/cat was 49,000 g/g, and the obtained polypropylene had CXS of 0.49% by weight, [η] of 2.08 dl/g, and a bulk density of 0.445 g/ml. Said polypropylene had a lower stereoregularity and a higher molecular weight than those of the polypropylene produced in each of Examples 3 to 6 using 2-isopropyl-2-isobutyl-1,3-dimethoxypropane.

Results are summarized in Table 1.

TABLE 2

| | Example 8 | Example 9 |
|---|---|---|
| Solid catalyst component | | |
| Ti (% by weight) | 1.84 | 1.51 |
| Phthalic acid ester compound (c) (% by weight) | 12.7 | 11.2 |
| 1,3-Diether compound (d)(% by weight) | 2.5 | 4.3 |
| (c) + (d) (% by weight) | 15.2 | 15.5 |
| (d)/(c) (molar ratio) | 0.27 | 0.52 |
| Polypropylene (Note-3) | | |
| PP/cat (g/g) | 60,200 | 59,200 |
| CXS (% by weight) | 0.65 | 0.41 |
| [η] (dl/g) | 1.89 | 1.86 |
| Bulk density (g/ml) | 0.436 | — |

Note-3:
(1) Regarding hydrogen added, Examples 8 and 9 were the same as each other in its amount; and
(2) regarding an external electron donor compound, Examples 8 and 9 were the same as each other in its kind.

The invention claimed is:

1. A solid catalyst component for α-olefin polymerization, which comprises a titanium atom, a magnesium atom, a

TABLE 1

| | Example | | | | | | | Comparative Example | | |
|---|---|---|---|---|---|---|---|---|---|---|
| | 1 | 2 | 3 | 4 | 5 | 6 | 7 | 1 | 2 | 3 |
| Solid catalyst component (Note-1) | | | | | | | | | | |
| Ti (% by weight) | 2.02 | 1.93 | 2.02 | 1.93 | 1.95 | 1.91 | 1.86 | 2.05 | 3.75 | 2.05 |
| Phthalic acid ester compound (c) (% by weight) | 10.6 | 9.6 | 10.6 | 9.6 | 12.1 | 11.5 | 11.6 | 13.0 | 0.0 | 13.0 |
| 1,3-Diether compound (d) (% by weight) | 3.8 | 7.2 | 3.8 | 7.2 | 1.5 | 2.4 | 3.4 | 0.0 | 15.0 | 0.0 |
| (c) + (d) (% by weight) | 14.4 | 16.8 | 14.4 | 16.8 | 13.6 | 13.8 | 15.0 | 13.0 | 15.0 | 13.0 |
| (d)/(c) (molar ratio) | 0.42 | 0.87 | 0.42 | 0.87 | 0.14 | 0.24 | 0.34 | 0 | ∞ | 0 |
| Polypropylene (Note-2) | | | | | | | | | | |
| PP/cat (g/g) | 57500 | 48400 | 46400 | 38200 | 55500 | 53500 | 33800 | 51500 | 23800 | 49000 |
| CXS (% by weight) | 0.51 | 0.48 | 0.39 | 0.42 | 0.41 | 0.37 | 0.39 | 0.65 | 2.6 | 0.49 |
| [η] (dl/g) | 0.76 | 0.74 | 1.95 | 1.83 | 2.01 | 2.00 | 1.95 | 0.89 | 0.48 | 2.08 |
| Bulk density (g/ml) | 0.414 | 0.417 | 0.427 | 0.431 | 0.428 | 0.447 | 0.442 | 0.414 | 0.393 | 0.445 |

Note-1:

An order of adding the 1,3-diether compound in the production of the solid catalyst component in each of Examples 1 to 5 was similar to one another; and an order thereof in Example 6, and an order thereof in Example 7 were different from that in Example 1, and also different from each other.

Each of Comparative Examples 1 and 3 did not use the 1,3-diether compound in the production of the solid catalyst component; and Comparative Example 2 did not use phthalic acid ester compound.

Note-2:

(1) Regarding hydrogen added, Examples 1 and 2 and Comparative Examples 1 and 2 were the same as one another in its amount; and (2) regarding an external electron donor compound, Examples 3 to 7 and Comparative Example 3 were the same as one another in its kind.

halogen atom, a phthalic acid ester compound, and a 1,3-diether compound, wherein an amount of the 1,3-diether compound contained in the solid catalyst component is 0.1 to 3 mol per one mol of the phthalic acid ester compound contained therein, an amount of titanium atom contained in the solid catalyst component is 1.51% to 2.02% by weight, and an amount of the solid catalyst component dried is 100% by weight.

2. The solid catalyst component for α-olefin polymerization according to claim 1, wherein the total of an amount of the phthalic acid ester compound contained in the solid catalyst component and an amount of the 1,3-diether compound contained therein is 5 to 30% by weight.

3. A process for producing a catalyst for α-olefin polymerization, comprising contacting: (i) at least a solid catalyst component for α-olefin polymerization, which solid catalyst component comprises a titanium atom, a magnesium atom, a halogen atom, a phthalic acid ester compound, and a 1,3-diether compound, wherein an amount of the 1,3-diether compound in the solid catalyst component is 0.1 to 3 moles per mole of the phthalic acid ester compound, an amount of titanium atom contained in the solid catalyst component is 1.51% to 2.02% by weight, and an amount of the solid catalyst component dried is 100% by weight, (ii) an organoaluminum compound, and (iii) an external electron donor compound with one another.

4. The process for producing a catalyst for α-olefin polymerization according to claim 3, wherein the external electron donor compound is an alkoxysilicon compound represented by the following formula:

$$R^3_r Si(OR^4)_{4-r}$$

wherein $R^3$ is a hydrocarbon group having 1 to 20 carbon atoms, a hydrogen atom, or a hetero atom-containing group, and when plural $R^3$s exist, they are the same as, or different from one another; $R^4$ is a hydrocarbon group having 1 to 20 carbon atoms, and when plural $R^4$s exist, they are the same as, or different from one another; and r is an integer satisfying $0 \leq r < 4$.

5. A process for producing an α-olefin polymer, comprising homopolymerizing or copolymerizing an α-olefin in the presence of a catalyst for α-olefin polymerization produced by a process comprising: contacting (i) at least a solid catalyst component for α-olefin polymerization which solid catalyst component comprises a titanium atom, a magnesium atom, a halogen atom, a phthalic acid ester compound, an a 1,3-diether compound, wherein an amount of the 1,3-diether compound contained in the solid catalyst component is 0.1 to 3 moles per mole of the phthalic acid ester compound, an amount of titanium atom contained in the solid catalyst component is 1.51% to 2.02% by weight, and an amount of the solid catalyst component dried is 100% by weight, (ii) an organoaluminum compound, and (iii) an external electron donor compound with one another.

* * * * *